United States Patent [19]

Durell

[11] Patent Number: 4,787,710

[45] Date of Patent: Nov. 29, 1988

[54] VARIABLE RATIO BEAM SPLITTER

[76] Inventor: William E. Durell, 41310 N. Westlake, Antioch, Ill. 60002

[21] Appl. No.: 881,933

[22] Filed: Jul. 3, 1986

[51] Int. Cl.⁴ .................. G02B 27/10; G02B 27/14; G02B 6/26; G02B 6/32

[52] U.S. Cl. ................... 350/173; 350/286; 350/486; 350/96.18

[58] Field of Search ............ 350/173, 287, 286, 486, 350/163, 394, 96.18, 96.19

[56] References Cited

U.S. PATENT DOCUMENTS

| | | | |
|---|---|---|---|
| 3,870,398 | 3/1975 | Love | 350/173 |
| 4,431,258 | 2/1984 | Fye | 350/173 |
| 4,671,613 | 6/1987 | Buhrer | 350/173 |

FOREIGN PATENT DOCUMENTS

| | | | |
|---|---|---|---|
| 2516254 | 5/1983 | France | 350/173 |
| 55-35354 | 3/1980 | Japan | 350/96.19 |

*Primary Examiner*—Jon W. Henry
*Attorney, Agent, or Firm*—Kinzer, Plyer, Dorn, McEachran & Jambor

[57] ABSTRACT

A continuously variable ratio beam splitter for dividing an initial p-polarized coherent light beam into two polarized output beams, with a range variation of zero to 100%, comprises an optical array including a right angle input prism facing a first right angle output prism along their hypotenuses and a penta prism coupling one side surface of the input prism to a side surface of a second right angle output prism; the two output prisms produce the output beams by division of light from an input beam impinging on the other side surface of the input prism. Variation of the intensity ratio of the output beams is accomplished by rotating the array so that the input light beam strikes the hypotenuse surface of the input prism between the critical angle and the Brewster angle for that prism surface. Simple one-spring positioner devices hold two fiber optic cables with the fiber ends at the foci of two lenses used to collect the output beams; those positioners provide rotational adjustment to preserve uniform polarization in the light outputs from the optical fibers. A device for demonstrating interference effects, comprising two simple attachments for the distal ends of the fiber optic cables, is also disclosed.

10 Claims, 3 Drawing Sheets

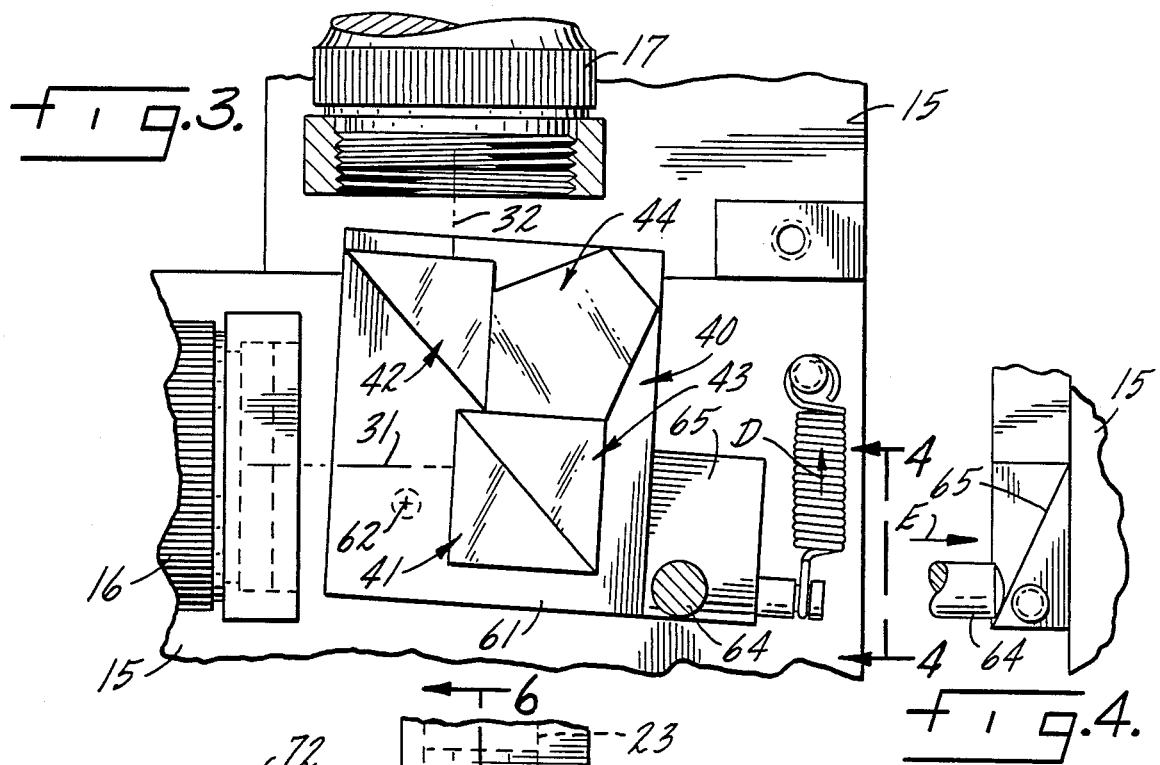
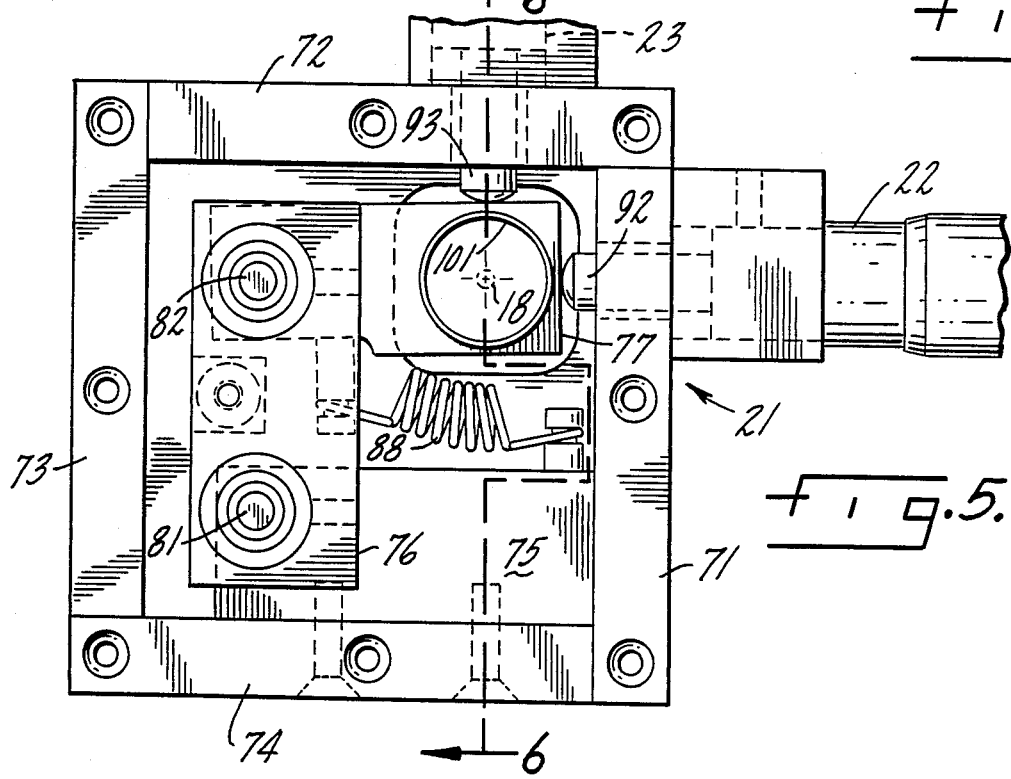

VARIABLE RATIO BEAM SPLITTER

BACKGROUND OF THE INVENTION

Beam splitters for coherent light beams, usually beams generated by lasers, have been used in a variety of applications, including holographic cameras and interferometers. The beam splitters known in the art have generally been unduly complex and expensive, particularly for applications demanding a truly broad ratio of intensities for the split beams, e.g. a full range of zero to 100% of input light to either output beam. Moreover, known beam splitters have usually been susceptible to major errors when subjected to virtually any vibration or like disturbance occurring during operation.

SUMMARY OF THE INVENTION

It is an object of the invention to provide a new and improved beam splitter, incorporating a unique optical array that is simple and inexpensive in construction yet essentially immune to most vibration and shock effects.

Another object of the invention is to provide a simple, inexpensive single-spring fiber optic positioner for a beam splitter that allows full tuning adjustment rotationally, laterally and axially.

A further object of the invention is to provide an inexpensive device for demonstrating interference effects with the output from a beam splitter, in the form of two simple attachments for fiber optic cables.

Accordingly, the invention relates to a variable ratio beam splitter for dividing an initial p-polarized beam of light into two polarized output beams, over a given intensity ratio range, comprising:

an optical array including first, second and third right angle prisms each having a hypotenuse surface and two side surfaces and a penta prism having two right-angle surfaces, a first side surface of each of the first and second right angle prisms affording an output comprising one of the two output beams and the third right angle prism affording an input for the initial beam through a first one of its side surfaces, the first and third right angle prisms being aligned facing each other along their hypotenuse surfaces, the penta prism being aligned with the third right angle prism with a first one of the two right angle surfaces of the penta prism facing the second side surface of the third right angle prism, and the second right angle prism being aligned with the penta prism with the second side surface of the second right angle prism facing the second right angle surface of the penta prism and the hypotenuse surface of the second right angle prism projecting at an angle of 45° from the second side surface of the third right angle prism;

and means to rotate the optical array relative to a source of an initial polarized beam of light directed toward and impinging upon the first side surface of the third right angle prism, over a predetermined angular range to vary the ratio of intensities of the two output beams over the aforeaid intensity ratio range.

BRIEF DESCRIPTION OF THE DRAWINGS

FIG. 3 is an enlarged-scale elevation view of a portion of the beam splitter of FIG. 1 with a cover removed to show the rotating mechanism for the optical array;

FIG. 4 is a detail view taken approximately as indicated by line 4—4 in FIG. 3;

FIG. 5 is an enlarged-scale view of a fiber optic cable positioning device, taken approximately as indicated by line 5—5 in FIG. 1, with the cover removed;

DESCRIPTION OF THE PREFERRED EMBODIMENTS

Figure 1:
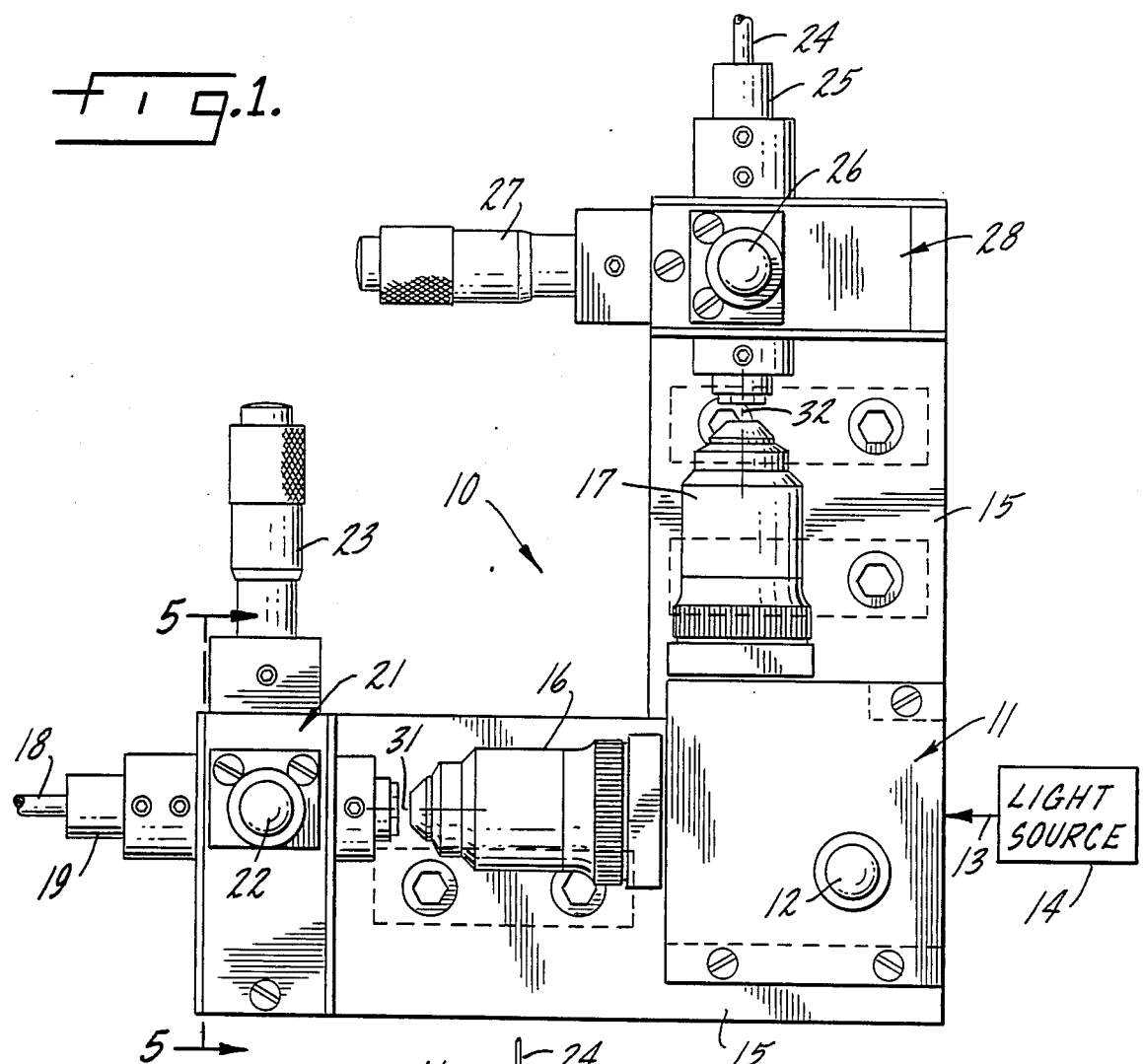
FIG. 1 is a side elevation view of a continuously variable ratio beam splitter constructed in accordance with a preferred embodiment of the invention.

FIG. 1 affords a side elevation view of a continuously variable ratio beam splitter 10, constructed in accordance with a preferred embodiment of the invention, for dividing an input polarized light beam into two polarized component output beams. Beam splitter 10 comprises an optical apparatus 11 provided with a rotary adjustment member 12; preferably, adjustment member 12 is a conventional micrometer screw or head. Optical apparatus 11 is mounted on a frame 15. The optical apparatus receives, as an input, a coherent, polarized light beam 13 derived from a li9ht source 14. The li9ht source may comprise a conventional laser, of the kind used in conjunction with commercial holo9raphic cameras, such as a helium-neon laser or a helium-cadmium laser; other li9ht sources, particularly lasers, may be utilized. Beam 13 should be p-polarized, as explained hereinafter.

Beam splitter 10 further comprises first and second lenses 16 and 17 mounted on frame 15 at right angles to each other. The first lens 16 is aligned on the center line of the input light beam 13 and is also aligned with cne end of an optical fiber cable 18 mounted in a cable holder 19 that projects through a positioning device 21 that includes two coordinate position adjustment members 22 and 23. The coordinate position adjustment members 22 and 23 are preferably micrometer heads. Similarly, the second lens 17 is aligned with the end of an optic fiber cable 24 held in a cable holder 25 extending through a positioning device 28 that incorporates two coordinate micrometer head position adjustment members 26 and 27. Optic cables 18 and 24 are preferably of the single mode type, of the kind sometimes known as polarization-preserving fibers. The diameter of the fiber itself may be approximately four microns.

The general mode of operation of beam splitter 10 can now be described. A coherent initia! polarized light beam 13 from source 14 enters optical apparatus 11. In apparatus 11 that initial beam is divided into two output beams, a first beam 31 from lens 16 and a second beam 32 from lens 17. The ends of fiber optic cables 18 and 24 are located at the focal points of the lenses 16 and 17 respectively. Accordingly, each fiber captures substantially all of the associated output beam (31 or 32). Output beams 31 and 32 are themselves polarized, with the same polarization as input beam 13. That polarization can be preserved, with appropriate precautions. At their remote ends, therefore, the fiber optic cables 18 and 24 afford related polarized light outputs suitable for holography, for demonstration of interference properties, and other applications.

In many of those applications, including holography, it is desirable or necessary to vary the intensity ratio range for the two beams represented in FIG. 1 by beams 31 and 32. In beam splitter 10, this is accomplished simply by adjusting optical apparatus 11 through the use of its rotary adjustment member, the micrometer head 12. Adjustment member 12 is used to vary the relative intensities of beams 31 and 32 over a ratio range of zero to 100 percent of the available light, as provided by input beam 13.

Figure 2:
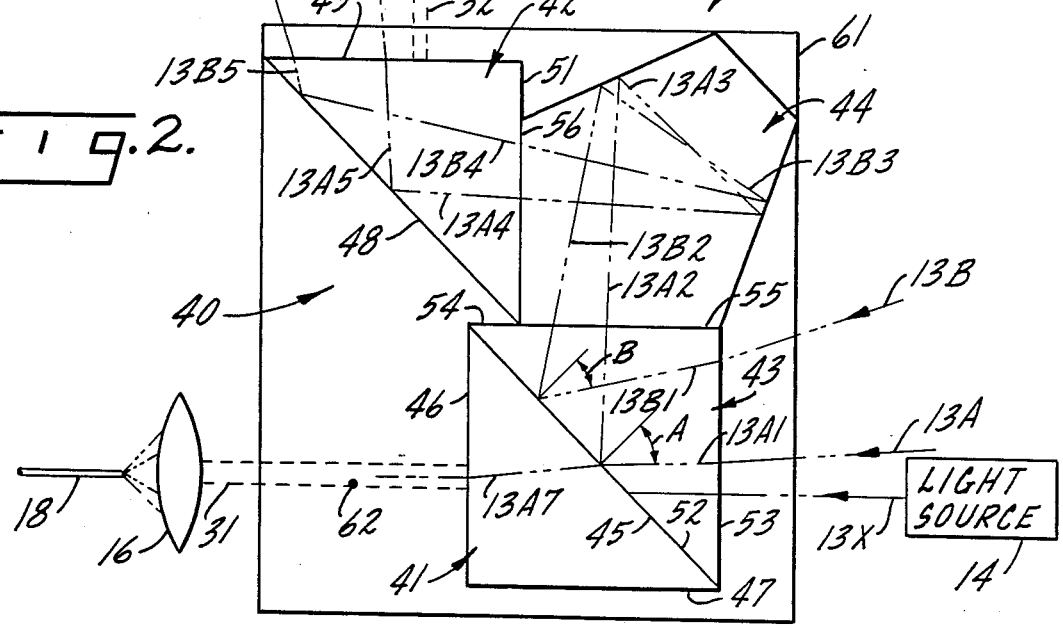
FIG. 2 is a partly schematic view, on an enlarged scale, of an optical array and auxiliary components of the beam splitter of FIG. 1.

FIG. 2 shows, in schematic form, the optical elements for the optical apparatus 11 of beam splitter 10. Apparatus 11 incorporates an optical array 40 including first, second and third right angle prisms 41, 42 and 43, and a penta prism 44. The first right angle prism 41 has a hypotenuse surface 45 and first and second side (normal) surfaces 46 and 47. The second right angle prism 42 has a hypotenuse surface 48 and first and second side surfaces 49 and 51. The third right angle prism 43 has a hypotenuse surface 52 and first and second side surfaces 53 and 54. The penta prism 44 has first and second right angle surfaces 55 and 56 and is of conventional configuration.

In optical array 40, the first right angle prism 41 is aligned with its hypotenuse surface 45 facing the hypotenuse surface 52 of the third prism 43. The penta prism 44 has its first right-angle side 55 facing and engaging the second side surface 54 of prism 43. The second right angle prism 42 is aligned with the penta prism 44, with surface 51 of prism 42 facing and engaging surface 56 of prism 44 so that hypotenuse surface 48 of prism 42 projects at an angle of 45° to surface 54 of prism 43.

All of the four prisms 41-44 are mounted in fixed positions, as shown in FIG. 2, on a rotatable base or support 61; adhesive mounting may be utilized. Support 61 is rotatable about an axis 62 perpendicular to the plane of the drawing.

In considering the operation of optical array 40 FIG. 2, it may be assumed that that array is aligned as shown with light source 14, so that the initial or input light beam follows a path 13X to impinge on surface 53 of the third prism 43, the input surface for the array. This is shown for purposes of illustration only; with the input beam striking surface 53 as indicated by line 13X the optical array 40 is not in its normal range of operation.

If support 61 is now rotated clockwise, it may be aligned with light source 14 so that the initial input beam enters array 40 along the path 13A. As the input beam passes through surface 53 of prism 43 it is refracted slightly to the path 13A1, which impinges on the hypotenuse surface 52 of prism 43 at an angle A. Angle A is one limit for the normal operational range of array 40 (and beam splitter 10); it is the critical angle, for prism 43, at which total internal reflection (TIR) occurs.

In these circumstances, all of the light from the incident input beam is reflected along path 13A2 and then, in sequence, along path segments 13A3 through 13A6. But the rotation of support 61 to alignment with light input path 13A has also aligned path segment 13A6 with the output beam path 32 that is parallel to the axis of lens 17. For this condition, with the input beam striking hypotenuse surface 52 of the third or input prism 43 at its critical angle A, all output is diverted to beam 32 and lens 17. If any light were to pass through surface 52 into prism 41 it would follow path 13A7, a continuation of path 13A1, and end up as beam 31, parallel to the axis of lens 16. Actually, no light goes to beam 31 and lens 16.

Further clockwise rotation of support 61 about axis 62 can be effected until the light from source 14 impinges on surface 53 of prism 43 along a path 13B and continues along a segment 13B1 of that path to impinge upon hypotenuse surface 52 at an angle B. Angle B is the Brewster angle for prism 43 and defines the other limit for the normal operation of optical array 40 and beam splitter 10, with all light transmitted through the facing parallel hypotenuse surfaces 52 and 45 and out through side surface 46 of prism 41 as output beam 31. If there were any light reflected back from surface 52 it would follow the path segments 13B2 through 13B6 to beam 32; actually, essentially no light traverses this path due to the p-polarization of the input beam.

It is thus seen that alignment of array 40 for the input path 13B, with the input beam impinging on the hypotenuse surface 52 of prism 43 at the Brewster angle B for polarized light from source 14, defines one limit for an operating range with all light input going to the first output beam 31 and none to the second output beam 32. Rotational alignment to coincidence with path 13A defines the other limit of the operating range, with all input light going to the second output beam 32 and none to beam 31. Angular adjustment of array 40 by rotating it about axis 62 can provide any desired intensity ratio for the two component output beams 31 and 32; adjustment over the intensity ratio range is continuous. For typical prisms of optical glass, type BK-7, the Brewster angle is about 33° and the critical angle is approximately 41°; the total angular range for operation of array 40 is thus relatively small.

The two component light output beams 31 and 32 do not necessarily line up precisely on the axes of lenses 16 and 17. The spread for beam 31 typically may be about 0.5 millimeters and for beam 32 about 0.3 millimeters. This causes no loss of efficiency for optical apparatus 11, however, if the input ends of the optical fibers 18 and 24 are located with reasonable accuracy at the foci of their associated lenses.

Prisms 41-44 should have mirror and anti-reflection coatings on various surfaces. Mirror coatings are preferably employed on prism surfaces 48 and on the exposed surfaces of penta prism 44. Anti-reflection coatings should be utilized on prism surfaces 45, 46, 49, 52, and 53. An index-matching adhesive is utilized between surfaces 51 and 56 and surfaces 54 and 55. Over the operating range between the impingement points of paths 13A1 and 13B1 on surface 52 there should be no contact between surfaces 45 and 52; rather, there should be a very thin air space over this range. As an example, in optical array 40 each of the three right angle prisms 41-43 may have side surfaces with lengths of 12.7 millimeters, with the penta prism having right-angle side surfaces of 10.0 mm.

FIGS. 3 and 4 show a simple but effective means to rotate the optical array 40 to vary the relative intensities of beams 31 and 32. The axially movable plunger 64 of the adjustment member, micrometer head 12 (FIG. 1) engages an inclined cam surface 65 that projects from the angularly movable support 61. A spring 66 connected to cam 65 and to frame 15 biases members 65 and 61 in the direction of arrow D. As plunger 64 is advanced in the direction of arrow E, support 61 and array 40 are turned clockwise due to inclined cam 65. When plunger 64 is retracted support 61 is pulled back counterclockwise by spring 66.

FIG. 5 shows a simple mechanism that may oe used for the positioning device 21 and also for the corresponding device 28 (FIG. 1). Device 21, as shown in FIG. 5, has a rectangular frame formed by four frame members 71–74. A fixed block 75 within the frame supports a first pair of guide members 76; members 76 are pivotable about an axis 81. Guide members 76 in turn carry a second guide member 77; pivotal movement of member 77 is permitted, about an axis 82. A spring 88 interconnects members 75 and 77. The plungers 92 and 93 of the micrometer heads 22 and 23, respectively, engage guide member 77 at right angles; spring 88 maintains guide member 77 in engagement with both plungers.

The two adjustment members, micrometer heads 22 and 23, afford a precise, means for adjusting the lateral position of optical fiber 18, which extends through a tube 101 in guide member 77, into accurate alignment with the axis of lens 16 (FIG. 1) to assure gathering all of beam 31 into the fiber optic cable 18.

Figure 6:
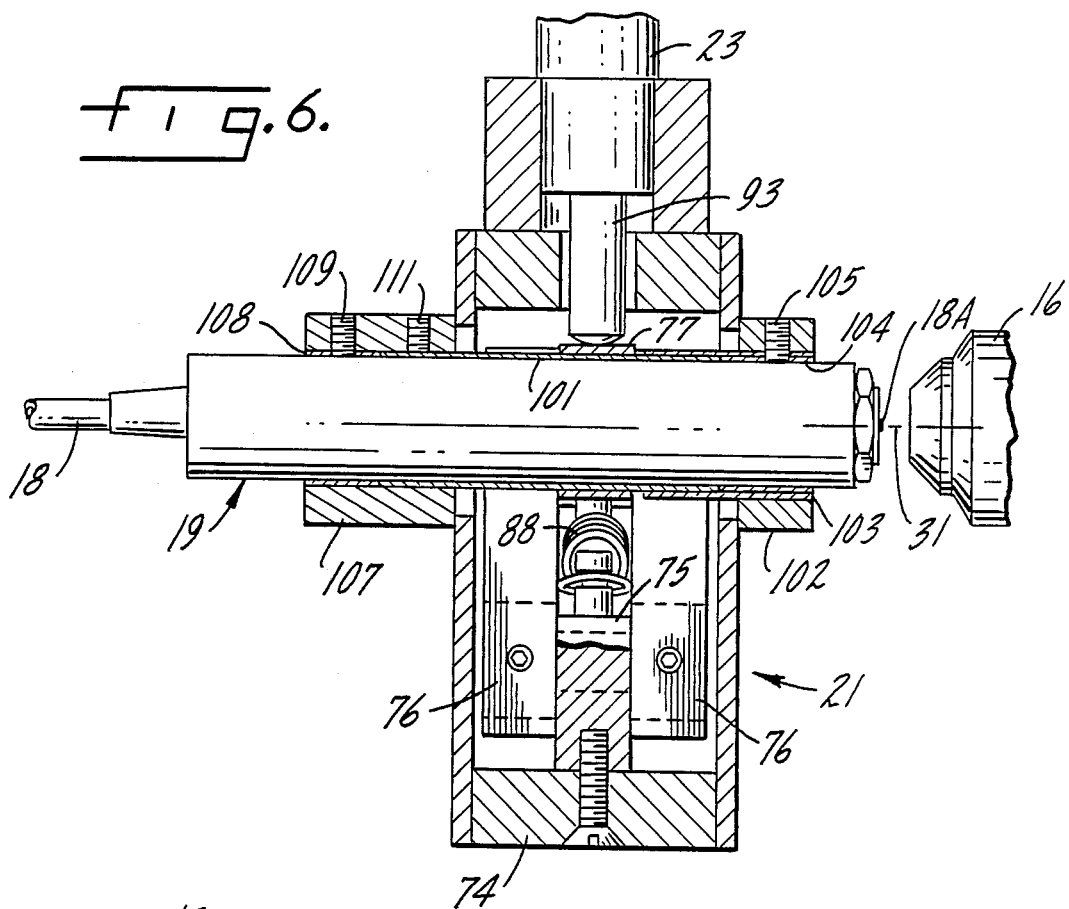
FIG. 6 is a sectional view taken approximately along line 6—6 in FIG. 5.

As shown in the sectional view of positioning device 21, FIG. 6, a brass tube 101 extends through and is affixed to guide member 77. The cylindrical cable holder 19 extends through tube 101 and also extends through a longitudinal stop comprising a collar 102 within which two concentric tubes 103 and 104 are mounted. Tube 103 is longer than tube 104. A set screw 105 extends through collar 102 and tubes 103 and 104 for engagement with the cable holder 19. Collar 102 is located at the side of positioning device 21 adjacent lens 16.

At the other side of positioning device 21, there is a collar 107 within which a thin tube 108 is mounted. Tubes 108 and 104 have the same thickness as the tube 101 that is mounted in guide member 77. There are two set screws in collar 107, a first set screw 109 that extends through both the collar and tube 108 and a second set screw 111 that is aligned with a portion of the collar that does not include tube 108. The internal construction of cable holder 19 is not shown; any appropriate construction, preferably one that accepts conventional fiber termination devices, may be utilized.

In the use of cable holder 19, as shown in FIG. 6, the axial position of the cable holder is first determined. The inner end 18A of the fiber from cable 18, as previously noted, must be aligned with substantial accuracy at the focus of lens 16. A simple thickness gauge may be employed. When this has been accomplished, set screws 105 and 109 are tightened. This precludes further axial movement of cable holder 19 and assures location of fiber optic end 18A at the desired spacing from lens 16. It is then a simple matter to align the cable laterally with the axis of the lens, using the two micrometer head positioning members 22 and 23 (FIGS. 5 and 6).

The angular position of cable holder 19 may also be of some importance, particularly when relatively long cables are employed and there may be twists and turns in the cable. In theory, a very thin optical fiber should retain the polarization of the light beam passing through the fiber without substantial modification. In practice, whenever there are twists or turns in the fiber, particularly for longer optical cables, the initial polarization may change. It is usually possible to correct this deficiency by changing the rotational alignment of the fiber optic cable. This can be accomplished simply by loosening set screw 111, which permits rotation of cable holder 19 without allowing for axial movement. When the initial polarization has been restored at the output of the cable, set screw 111 is tightened and operation may be maintained.

Figures 7, 8:
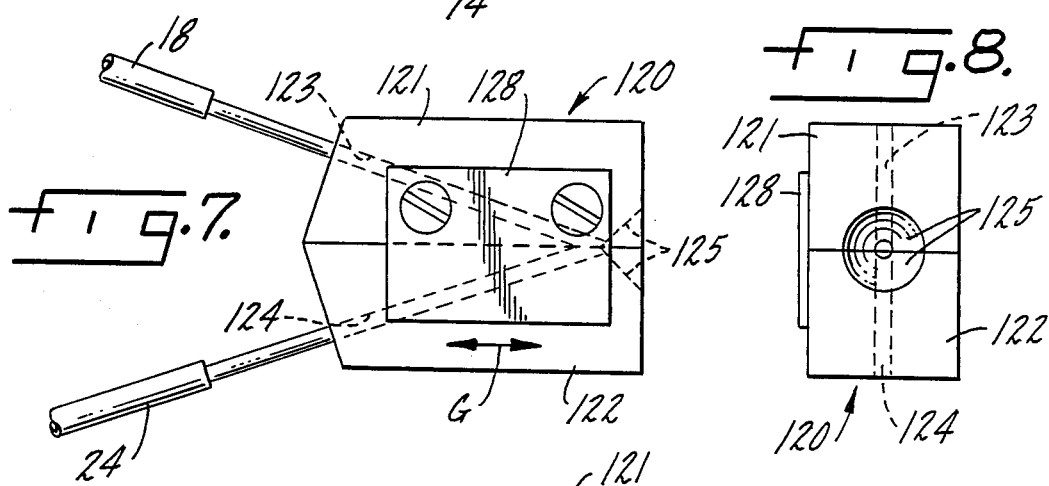
FIGS. 7 and 8 are enlarged elevation views of a demonstration device formed by simple attachments to the distal ends of fiber optic cables fed by the beam splitter of FIG. 1.
Figure 9:
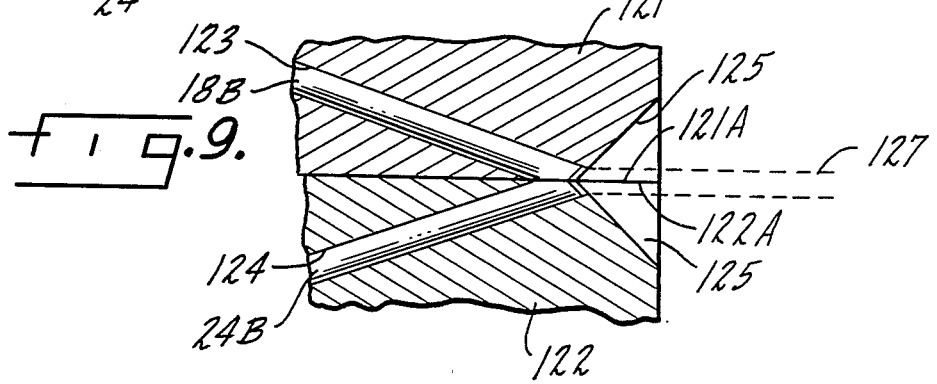
FIG. 9 is a greatly enlarged sectional view of the device of FIGS. 6 and 7.

FIGS. 7, 8 and 9 illustrate a demonstration device 120 afforded by two simple attachments 121 and 122 on the distal ends of the fiber optic cables 18 and 24. Device 121 is a simple metal block through which a small hole 123 has been drilled at an acute angle, substantially smaller than 45°. Attachment 122 is of similar construction, comprising a metal block through which a small angularly oriented hole 124 extends. The holes 123 and 124 are at matched angles in the two metal blocks 121 and 122 and terminate at a recess 125 formed in both blocks and affording a continuous recess when the blocks are disposed in alignment with each other as shown in the drawings. The optical fiber from cable 18 extends through hole 123 in block 121; similarly, the optical fiber from cable 24 extends through the hole 124 in block 122. The holes 123 and 124 may not be of uniform diameter; preferably, the outer portion of the fiber as inserted in each of these holes is encased with a protective metal sleeve but the inner tip ends of the fibers may be free of any such metallic protection.

As shown in the enlarged detail view of FIG. 9, the inner ends 18B and 24B of the two optical fibers are sheared and polished to coincide with the mating surfaces 121A and 122A of blocks 121 and 122. With the two blocks 121 and 122 accurately aligned as shown in the drawings, and with the angular relation of the tip ends of the optical fibers properly selected (e.g., an angle of 20°, the light beams emerging from the optical fiber tips 18B and 24B, being in the same phase, combine additively to produce a maximum strength output beam as generally indicated at 127. However, if the two blocks are displaced laterally relative to each other as indicated by arrows G in FIG. 7, the light beam emerging from the fiber optics 18B and 24B may be adjusted to cancel each other, wholly or partially. Indeed, with some care, the user can adjust the metal blocks constituting attachments 121 and 122 relative to each other to a position that affords no light output from the device. By directing beam 127 against a blank wall or a screen, demonstration of interference properties of polarized light beams is readily effected. To aid in guiding the movements of attachments 121 and 122 relative to each other, one or more side guide plates 128 may be affixed to the attachments to assure maintenance of accurate lateral alignment for the fiber optics.

Beam splitter 10 is far less susceptible to disturbance by external vibration than conventional beam-dividing devices. If beam splitter 10 and its light source 14 are firmly mounted on a common base, most external disturbances have no discernible effect on operation of the beam splitter. As compared to other comparable mechanisms, beam splitter 10 is simple and inexpensive in construction yet highly reliable and precise in operation.

I claim:

1. A variable ratio beam splitter for dividing an initial p-polarized beam of light into two polarized output beams, over a given intensity ratio range, comprising:
   an optical array including first, second and third right angle prisms each having a hypotenuse surface and two side surfaces and a penta prism having two right-angle surfaces, a first side surface of each of the first and second right angle prisms affording an output comprising one of the two output beams and the third right angle prism affording an input for the initial beam through a first one of its side surfaces, the first and third right angle prisms being aligned facing each other along their hypotenuse surfaces, the penta prism being aligned with the third right angle prism with a first one of the two right angle surfaces of the penta prism facing the second side surface of the third right angle prism, and the second right angle prism being aligned with the penta prism with the second side surface of the second right angle prism facing the second right angle surface of the penta prism and the hypotenuse surface of the second right angle prism projecting at an angle of 45° from the second side surface of the third right angle prism;

and means to rotate the optical array relative to a source of an initial polarized beam of light directed toward and impinging upon the first side surface of the third right angle prism, over a predetermined angular range to vary the ratio of intensities of the two output beams over the aforeaid intensity ratio range.

2. A variable ratio beam splitter according to claim 1 in which the angular range for rotation of the optical array extends between:

a first angular alignment at which the input light beam impinges upon the hypotenuse surface of the third right angle prism at the critical angle for that prism to afford total internal reflection, so that 100% of the light output goes to the output from the second right angle prism and 0% to the output from the first right angle prism;

and a second angular alignment at which the input light beam impinges upon the hypotenuse surface of the third right angle prism at the Brewster angle for that prism to afford zero internal reflection, so that 100% of the light output goes to the output from the first right angle prism and 0% to the output from the second right angle prism;

whereby the beam splitter affords a continuous intensity ratio range of 0 to 100%.

3. A continuously variable ratio beam splitter according to claim 2, further comprising:

a first lens, aligned with the first side surface of the first right angle prism, for focusing the output beam therefrom on a first focal point; and a second lens, aligned with the first side surface of the second right angle prism, for focusing the output beam therefrom on a second focal point.

4. A variable ratio beam splitter according to claim 3 in which each of the first and second lenses is a microscope objective lens.

5. A variable ratio beam splitter according to claim 3 and further comprising:

a first fiber optic cable having one end mounted at the focal point of the first lens, facing toward that lens; and a second fiber optic cable having one end mounted at the focal point of the second lens, facing toward that lens.

6. A variable ratio beam splitter according to claim 1, in which all of the right angle prisms are matched in size and the right angle surfaces of the penta prism are appreciably shorter than the side surfaces of the right angle prisms.

7. A variable ratio beam splitter for dividing a polarized input beam of light into two polarized output beams, over a given intensity ratio range, comprising:

an optical array including:

optical divider means for dividing an impinging polarized input light beam into first and second intermediate beams directed along first and second intermediate paths within the optical array, the division of light between the two intermediate beams being dependent upon alignment of impingement of the input light beam upon the divider means;

the first intermediate beam comprising a first output beam;

a right angle prism having first and second right-angle side surfaces and a hypotenuse surface; and a penta prism having first and second right angle surfaces, the first right angle surface of the penta prism extending across the second intermediate beam path and the second right angle surface of the penta prism abutting the second side surface of the right angle prism to thereby develop a second output beam projected along a path extending outwardly from the first side surface of the right angle prism;

and the beam splitter further comprising:

means for shifting the optical array relative to a source of an initial polarized beam of light directed toward and impinging upon the optical divider means, over a predetermined range, to vary the ratio of intensities of the two output beams over the aforesaid intensity ratio range.

8. A continuously variable ratio beam splitter according to claim 7, in which:

The angular alignment of the optical divider means with the input beam determines the relative division of light between the two intermediate beams;

the intermediate paths are angularly displaced from each other; and the shifting means rotates the optical array.

9. A continuously variable ratio beam splitter according to claim 8 and further comprising:

first lens means, aligned with the first output beam, for focusing the first output beam on a first focal point; and second lens means, aligned with the first side surface of the right angle prism, for focusing the second output beam on a second focal point.

10. A variable ratio beam splitter according to claim 9 and further comprising:

a first fiber optic cable having one end mounted at a focal point for the first lens means, facing toward that lens means; and a second fiber optic cable having one end mounted at a focal point for the second lens means, facing toward that lens means.

* * * * *